(12) United States Patent
Guo et al.

(10) Patent No.: US 10,572,379 B2
(45) Date of Patent: Feb. 25, 2020

(54) DATA ACCESSING METHOD AND DATA ACCESSING APPARATUS

(71) Applicant: Lenovo (Beijing) Co., Ltd., Beijing (CN)

(72) Inventors: Qi Guo, Beijing (CN); Jianwei Lu, Beijing (CN); Qingtao Sun, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 266 days.

(21) Appl. No.: 14/500,344

(22) Filed: Sep. 29, 2014

(65) Prior Publication Data

US 2015/0242310 A1    Aug. 27, 2015

(30) Foreign Application Priority Data

Feb. 21, 2014  (CN) .......................... 2014 1 0060900

(51) Int. Cl.
  *G06F 12/02* (2006.01)
(52) U.S. Cl.
  CPC ...... *G06F 12/0246* (2013.01); *G06F 12/0238* (2013.01); *G06F 2212/7205* (2013.01)
(58) Field of Classification Search
  CPC ............ G06F 12/0246; G06F 12/0238; G06F 2212/7205
  See application file for complete search history.

(56) References Cited

U.S. PATENT DOCUMENTS

| | | | | |
|---|---|---|---|---|
| 6,243,713 | B1* | 6/2001 | Nelson | .................... G06F 16/40 |
| 8,438,138 | B2* | 5/2013 | Rathi | ...................... G06F 3/048 |
| | | | | 707/665 |
| 2003/0097538 | A1* | 5/2003 | Hall | ...................... G06F 8/4442 |
| | | | | 711/201 |

(Continued)

FOREIGN PATENT DOCUMENTS

| CN | 101051315 A | 10/2007 |
|---|---|---|
| CN | 101464838 A | 6/2009 |
| CN | 103425602 A | 12/2013 |

OTHER PUBLICATIONS

Office Action, and English language translation thereof, in corresponding Chinese Application No. 201410060900.5, dated Jun. 16, 2017, 16 pages.

(Continued)

*Primary Examiner* — Eric Cardwell
(74) *Attorney, Agent, or Firm* — Brinks Gilson & Lione; John C. Freeman

(57) ABSTRACT

A data accessing method and a data accessing apparatus are provided. The method includes acquiring a size of a minimum access unit of a storage device; reading first data to be written into the storage device; determining whether a size of the first data is equal to an integer multiple of the size of the minimum access unit; and if the size of the first data is equal to an integer multiple of the size of the minimum access unit, storing the first data into the integer multiple of the minimum access unit in alignment; otherwise, adding padding data to the first data such that the size of the first data is equal to the integer multiple of the size of the minimum access unit, and storing the first data into the integer multiple of the minimum access unit in alignment.

16 Claims, 7 Drawing Sheets

(56) References Cited

U.S. PATENT DOCUMENTS

| | | | | |
|---|---|---|---|---|
| 2010/0005228 A1* | 1/2010 | Fukutomi | ............. | G06F 11/108 |
| | | | | 711/103 |
| 2012/0254514 A1* | 10/2012 | Nishikubo | .......... | G06F 12/0246 |
| | | | | 711/103 |
| 2014/0223089 A1* | 8/2014 | Kang | ................. | G06F 12/0246 |
| | | | | 711/103 |

OTHER PUBLICATIONS

Chinese Patent Office, Office Action No. 2 in corresponding Chinese Patent Application No. 201410060900.5 dated Dec. 14, 2017, 16 pages (including English Translation).

* cited by examiner

DATA ACCESSING METHOD AND DATA ACCESSING APPARATUS

This application claims priority to Chinese patent application No. 201410060900.5 filed on Feb. 21, 2014, the entire contents of which is incorporated herein by reference.

BACKGROUND

The present disclosure relates to the field of computer technology, and more particularly, to a data accessing method and a data accessing apparatus.

In recent years, with the development of computer technology, various electronic devices like smart phones, multimedia players, personal digital assistants (PDA), laptop computers, tablet computers, personal computers and others are widely used, among which, processing capability of a processing unit has been continuously enhanced while storage capacity and storage speed of a storage device have also been improved.

With people's increasing needs of data accessing, a storage device with a mechanical structure like a traditional hard disk (HDD) is unable to meet requirement. Instead, a digital storage device such as a solid state hard disk (SSD) or the like is proposed. The digital storage device has an extremely high access speed, but its access life (esp. the number of writes is still subject to technical limits at present.

In the traditional HDD, a logical block addressing (LBA) mode is adopted to find content stored thereon. In the LBA mode, a data area on the HDD is uniquely determined by a head, a cylinder (i.e., track), and a sector where it is located. However, the digital storage device has no physical LBA, the chip structure adopted by it is not helical track either. Alternatively, the digital storage device provides access service based on a mapping of a logical address and a physical address, that is, it provides a logical address to an external electronic device to access, and internally achieves a conversion of the logic address and the physical address through the mapping of the logical address and the physical address, thereafter provides actual data access service within the physical address.

As a large number of digital storage devices enter the market, in order to make electronic devices adapt to these digital storage devices, each operating system has made some changes. For example, in Microsoft's operating system Windows 7, disk defragment function designed for the traditional HDD is forbidden. In a defragment process for the traditional HDD, since the logical address of Windows is exactly the same as the physical address of the traditional HDD, chat is, both takes one sector (typically 512 bytes (B)) as a minimum data access unit, so that this function can easily concentrate fragment data (e.g., a file is stored in various parts of a dispersed space on the HDD) in consecutive addresses in order to accelerate the speed to read the file.

However, for the digital storage device, as described above, the logical address of Windows and the physical address of the digital storage device are not the same; the two only have a mapping relationship. Windows takes one sector (typically 512 B) as a minimum data access unit; whereas the digital storage device takes one page (typically 4 kilobytes (KB)) as a minimum data access unit. Therefore, the existing disk defragment function in Windows cannot directly process the physical address in the digital storage device, so this function not only is ineffective for the digital storage device, but may accelerate consumption of its life due to meaningless read and write operations.

Therefore, a new type of data accessing method and data accessing apparatus is desired to solve the above problem.

SUMMARY

To solve the above technical problem, according to an aspect of the present disclosure, there is provided a data accessing method applied to an electronic device that includes a storage device, wherein the data accessing method comprises: acquiring a size of a minimum access unit in the storage device; reading first data to be written into the storage device; determining whether a size of the first data is equal to an integer multiple of the size of the minimum access unit; if the size of the first data is equal to an integer multiple of the size of the minimum access unit, storing the first data into the integer multiple of the minimum access unit in alignment; and otherwise, adding padding data to the first data such that the size of the first data is equal to the integer multiple of the size of the minimum access unit, and storing the first data into the integer multiple of the minimum access unit in alignment.

In addition, according to another aspect of the present disclosure, there is provided a data accessing apparatus applied to an electronic device that includes a storage device, wherein the data accessing apparatus comprises: a size acquiring unit configured to acquire a size of a minimum access unit in the storage device; a data reading unit configured to read first data to be written into the storage device; a size determining unit configured to determine whether a size of the first data is equal to an integer multiple of the size of the minimum access unit; and a data storing unit configured to, if the size of the first data is equal to an integer multiple of the size of the minimum access unit, store the first data into the integer multiple of the minimum access unit in alignment; and, otherwise, add padding data to the first data such that the size of the first data is equal to the integer multiple of the size of the minimum access unit, and store the first data into the integer multiple of the minimum access unit in alignment.

Other features and advantages of the present disclosure will be described in the description which follows, some of them become apparent from the specification, or can be learned by implementing the present disclosure. The objectives and other advantages of the present disclosure can be realized and attained by the structures specifically specified in the specification, the claims, and the drawings attached thereto.

BRIEF DESCRIPTION OF THE DRAWINGS

The accompanying drawings are to provide a further understanding of the present disclosure and constitute a part of this specification; they serve to explain the present disclosure together with the embodiments thereof, and are not construed as limiting the present disclosure. In the drawings.

DETAILED DESCRIPTION

Figure 1:
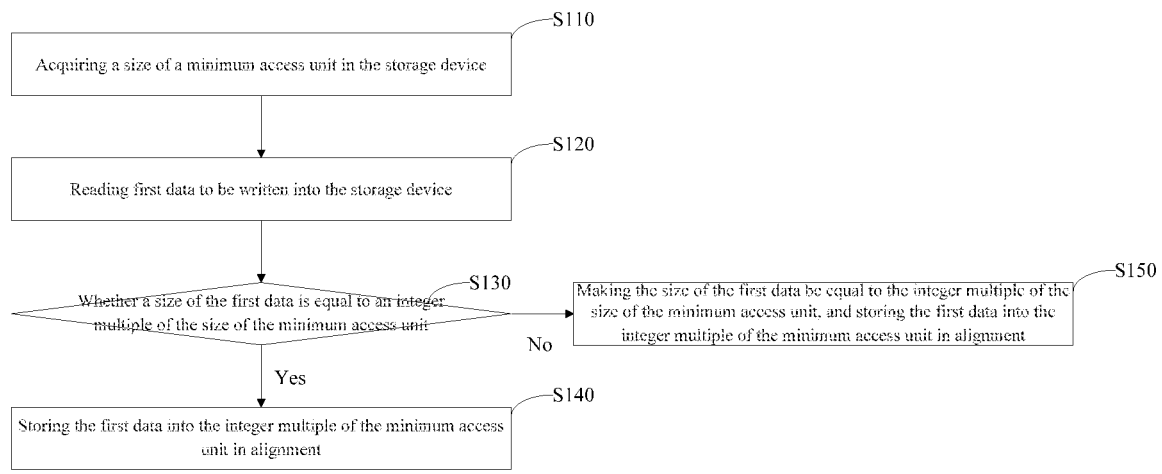
FIG. 1 illustrates a data accessing method according to a first embodiment of the present disclosure.

Various embodiments of the present disclosure will be described in detail with reference to the drawings. Here, it should be noted that, in the drawings, the same reference numerals are given components having substantially the same or similar structure and function, and repeated description thereof will be omitted.

Hereinafter, the data accessing method of the present disclosure will be described in various specific embodiments.

The data accessing method according to an embodiment of the present disclosure is applied to an electronic device. The electronic device may be a personal computer, a smart TV, a tablet computer, a mobile phone, a digital camera, a personal digital assistant, a portable computer, a smart desktop, a game console etc.

The electronic device may include a storage device. In an embodiment of the present disclosure, the storage device is for example a digital storage device. The digital storage device may adopt a non-volatile flash memory technology based on NOR or NAND structure, provides data access service to the electronic device through a mapping between the logical address and the physical address. For example, the digital storage device may be a solid state hard disk (SSD) etc.

Generally, the SSD may include a plurality of memory blocks, and each memory block may include a plurality of memory pages. Read and write operations on the SSD take the memory page in the memory block as a unit, whereas erase/program operations on the SSD take the memory block as a unit, that is, in the SSD, page is a minimum access (read-write) unit, whereas block is a minimum erase/program unit.

Specifically, take the SSD of the 34-nanometer(nm) flash chip (L63B particles) produced by Intel Corporation as example, capacity of one memory page is 4 KB, and one memory block is composed by 256 memory pages.

In addition, the electronic device is installed with an operating system. The operating system is a key component of a computer system, in charge of basic tasks like managing and configuring memory, determining priorities of supply and demand of system resources, and controlling input/output (I/O) devices, operating network and managing file system etc. The most important is that the operating system can control to store data into the storage device, read data from the storage device, or delete data from the storage device. In addition, the operating system can also provide a disk defragment function.

Disk fragment is also known as file fragment, it is formed because the file is stored dispersedly in different locations of the whole disk, but not continuously stored in continuous sectors in the disk. Specifically, after the traditional HDD is used for some time, due to repeatedly writing and deleting files, idle sectors in the disk will be dispersed to discrete physical locations of the whole disk, so that the file cannot be stored in continuous sectors. In this way, when reading and writing a file next time, it needs to read from different locations, which increases back and forth movement of the head, and reduces the access speed of the disk. Disk defragment is to rearrange the fragmented and cluttered files generated during a long-term use of the computer disk, release more disk space, and improve the overall performance and running speed of the computer.

As described in BACKGROUND ART, the existing disk defragment function is often designed for the traditional HDD. Because the logical address of the operating system and the physical address of the traditional HDD both take one sector (typically 512 B) as the minimum data access unit, so this function can be well applied to the traditional HDD.

However, for the SSD, there is only a mapping relationship between the logical address of the operating system (with 512 B as the minimum data access unit) and the physical address of the SSD (with 4 KB as the minimum data access unit), so this function cannot continue to apply.

In addition, the inventor of the present disclosure has also found that the mapping relationship of the SSD not only makes the defragment function of the traditional disk useless, but also lowers data access performance of a related operation when the operating system accesses data with the traditional data accessing method.

For this reason, an embodiment of the present disclosure provides a data accessing method, which can use advantages of the SSD to a larger degree, and improves performance of the SSD.

FIG. 1 illustrates a data accessing method according to a first embodiment of the present disclosure.

The data accessing method illustrated in FIG. 1 may be applied to an electronic device that includes a storage device.

The data accessing method according to the first embodiment of the present disclosure will be described in the following scenario in which it is assumed that the electronic device is a notebook computer that includes a solid-state hard disk (SSD), and the notebook computer uses the Windows operating system to perform data access operations on the SSD, and it is assumed that, in the operating system, one sector, as the minimum data access/erase unit, has a capacity of 512 B; whereas in the SSD, one memory page, as the minimum data access unit, has a storage capacity of 4 KB, one memory block, as a minimum erase unit, includes 256 memory pages, that is, its capacity is 256×4 KB=1024 MB.

However, it should be noted that the present disclosure is not limited thereto. Instead, the embodiment of the present disclosure may be applied to any interaction processes (e.g. data write, data read, data erasure, disk defragment etc.) with other operating systems (e.g., Android, iOS, etc.) of other digital storage devices (e.g., USB) in one or more other electronic devices (e.g. personal computers, tablet computers, mobile phones, multimedia players, personal digital assistants, ultrabooks, smart TVs etc.). In addition, in other opera ng systems, capacity of one sector may be 1 KB, 2 KB, 4 KB, etc; in other digital storage devices, capacity of one memory page may be 1 KB, 2 KB, 4 KB, 16 KB, or even higher, and one memory block may include more memory pages.

As illustrated in FIG. 1, the data accessing method comprises:

in step S110, acquiring a size of a minimum access unit in the storage device.

In the embodiment of the present disclosure, the electronic device (e.g., a notebook compute) comprises a storage device (e.g., an SSD), and performs data write and erase operations on the storage device under control of the operating system (e.g., Windows).

The storage device may include an address mapping table representing a correspondence between the logical block address (LBA) and the physical block address (PBA) of data, and performs read and write operations with respect to a corresponding physical block address of the storage device according to the logic block address pointed out by the operating system of the electronic device.

When the operating system desires to write data into the storage device, the operating system accesses the storage device based on the logical address. The operating system first allocates a logical address to the data write operation, and thereafter writes the needed data into the logical address.

For example, when data to be written is two small files, and size of a first file is 3 KB, and size of a second file is 4 KB, the operating system may write the data into a sector (e.g., capacity of each sector is 512 B), which serves as the minimum access unit. Since 3 KB 0.1-4 KB=7 KB=14×512 B, so the write operation will take up a storage space of 14 sectors. It is assumed, preferably, that the allocated 14 sectors are a consecutive logical address, which is Sector 101-114, respectively. Then the operating system can store the data continuously in the aforesaid logical address.

Accordingly, in the storage device, the physical address that can be identified by it is allocated and a mapping relationship between the allocated physical address and the logical address in the operating system is recorded.

For example, the storage device may write the data into the memory page (e.g., capacity of each memory page is 4 KB), which serves as the minimum access unit. Since one memory page can contain 4 KB data, so the write operation will take up a storage space of 2 memory pages. It is assumed that the allocated physical address of the memory page is Block 1 Page 1-2. Thus, in the address mapping table, the following entry is added: logical address Sector 101-114 corresponding to physical address Block 1 Page 1-2. Then, the storage device may write the data in the aforesaid physical address.

It is assumed that execution of the write process starts from a storage location of 1 KB of Block 1 Page 1, it can be found out that 3 KB space to which the first file corresponds to can be completely stored in Block 1 Page 1, but 4 KB space to which the second file corresponds needs be acrossstored in Block 1 Page 1 and Block 1 Page 2. Specifically, 3 KB data of the first file will be stored in the first 3 KB in the 4 KB storage space of Page 1, whereas the first 1 KB data of the second file will be stored in the last 1 KB of the 4 KB storage space of Page 1, and the last 3 KB data of the second file will be stored in the first 3 KB of the 4 KB storage space of Page 2.

Thus, it can be found out, when the operating system needs to read the first file later, the storage device only needs to access the physical address Block 1 Page 1 according to the mapping table, and just read data of the first 3 KB; whereas when the operating system needs to read the second file later, the storage device needs to perform more operations. First, the storage device accesses the physical address Block 1 Page 1 according to the mapping table, and then shifts the pointer from 1 KB to 4 KB therein, and then reads the last 1 KB data therefrom, next, the storage device also needs to further access the physical address Block 1 Page 2, and read the first 3 KB data. In this way, reading the second file entails accessing two memory pages in the storage device, which lengthens the operation time, and thereby slows down the data access speed.

In the embodiment of the present disclosure, in order to accelerate the data access speed, preferably, when the operating system needs to write data the operating system first acquires a size of a minimum access unit in the storage device.

Specifically, the operating system may transmit, to the storage device, a request for acquiring the size of the minimum access unit in the storage device; and receive, from the storage device, a response for feeding back the size of the minimum access unit in the storage device.

For example, the operating system may acquire the size of the memory page in the SSD through an Identify command in an Advanced Technology Attachment (ATA) command set. Then, a controller in the SSD may query the size of the memory page therein based on the command, for example, in this embodiment, the size is 4 KB. Finally, the controller feeds back the size of the memory page to the operating system through an ATA command.

In step S120, reading first data to be written into the storage device.

After acquiring the size of the minimum access unit of the storage device, the operating system may read the first data to be written into the storage device into memory in order to execute the write operation later.

In step S130, determining whether a size of the first data is equal to an integer multiple of the size of the minimum access unit.

Before the operating system writes the first data into the storage device, in order to prevent the first data from being unnecessarily across-written in a plurality of minimum storage units as in the above example, the electronic device determines whether a size of the first data is equal to an integer multiple of the size of the minimum access unit through the operating system. If the determining result is positive, then the method proceeds to step S140, and if the determining result is negative, then the method proceeds to step S150.

Specifically, in this embodiment, the operating system determines whether the size of the first data is equal to the storage capacity of the memory page (i.e., 4 KB). For example, when the first data to be written includes two files, the first file and the second file as described above, the operating system determines the data capacity included by the first file and second file, respectively. As mentioned above, it is assumed that capacity of the first file is 3 KB, whereas capacity of the second file is 4 KB. Therefore, the size of the first file is less than the size of the memory page, while the size of the second file is equal to the size of the memory page.

In step S140, storing the first data into the integer multiple of the minimum access unit in alignment.

Preferably, it is possible to perform the step of storing the first data into the integer multiple of the minimum access unit in alignment by operations of: determining a first start address to start storing the first data; determining whether the first start address is a start address of one minimum access unit; if yes, beginning with the first start address, storing the first data into the integer multiple of the minimum access unit in alignment; and otherwise, shifting the first start address, so that the first start address becomes a start address of one minimum access unit, and beginning with the first start address, storing the first data into the integer multiple of the minimum access unit in alignment.

In this embodiment, when it is determined that capacity of the second file is 4 KB, exactly equal to the storage capacity of one memory page, then the operating system may send the second file directly to the storage device for storage.

Specifically, when the operating system desires to write the second file into the storage device, the operating system may write the data into a sector (e.g., capacity of each sector is 512 B), which serves as the minimum access unit. Since 4 KB=8×512 B, so the write operation will take up a storage space of 8 sectors. It is assumed, preferably, that the logical address of the allocated 8 sectors is Sector 109-116, respectively. Then the operating system can continuously store the data in the aforesaid logical address.

Accordingly, the storage device may write the data into the memory page (e.g., capacity of each memory page is 4 KB), which serves as the minimum access unit. Since one memory page can contain 4 KB data, so that the write operation just takes up a storage space of one memory page. It is assumed that the allocated physical address of the memory page is Page 2. Thus, the following entry is added in the address mapping table: logical address Sector 109-116 corresponding to physical address Block 1 Page 2.

In this case, preferably, the storage device determines whether the physical address for storing the second file starts from 1 KB of Page 2. If the determining result is positive, then the storage device writes the second file into Page 2 from 1 KB till 4 KB fully. If the determining result is negative, for example, if the first 1 KB in Page 2 is already stored with data, then the storage device may determine whether Page 3 or other memory pages after Page 2 is completely empty. When it is found out that no data has been stored in Page 3 yet, the storage device may amend the allocated physical address as Page 3, i.e., the entry of logical address Sector 109-116 corresponding to physical address Block 1 Page 2 in the address mapping table is amended into the following entry: logical address Sector 109-116 corresponding to physical address Block 1 Page 3. Then, the storage device writes the second file into Page 3 from 1 KB till 4 KB fully.

In step S150, adding padding data to the first data such that the size of the first data is equal to the integer multiple of the size of the minimum access unit, and storing the first data into the integer multiple of the minimum access unit in alignment.

When it is determined that capacity of the first file is 3 KB, less than a storage capacity of one memory page, the operating system may first add padding data to the first file until capacity of the first file is equal to the storage capacity of one memory page, then the first file is transferred to the storage device for storage.

Specifically, when the operating system desires to write the first file into the storage device, the operating system may first add 1 KB padding data to the first file of 3 KB, so that capacity of the first file changes to 4 KB. Thereafter, the operating system writes the data into a sector, which serves as the minimum access unit (e.g., capacity of each sector is 512 B). Since 4 KB=8×512 B, so this write operation will take up a storage space of 8 sectors. It is assumed, preferably, that the allocated logical address of the 8 sectors is Sector 101-108, respectively. Thereafter, the operating system may continuously store the data into the aforesaid logical address.

Accordingly, the storage device may write the data into the memory page, which serves as the minimum access unit (e.g., capacity of each memory page is 4 KB). Since one memory page can contain 4 KB data, so the write operation will take up a storage space of 1 memory page. It is assumed that the allocated physical address of the memory page is Block 1 Page 1 Thus, in the address mapping table, the following entry is added: logical address Sector 101-108 corresponding to physical address Block 1 Page 1.

Likewise, preferably, the storage device determines whether the physical address for storing the first file starts writing from 1 KB of Page 1. If the determining result is positive, then the storage device writes the second file into Page 1 from 1 KB till 4 KB fully. Otherwise, the storage device may shift the physical address until the physical address becomes a start location of a memory page.

Thus, it is found out that when the operating system needs to read the first file later, the storage device just needs to access the physical address Block 1 Page 1 based on the address mapping table, and discard the last 1 KB padding data after reading the 4 KB data. Also, when the operating system needs to read the second file later, the storage device just needs to access the physical address Block 1 Page 2 based on the address mapping table, and directly read the 4 KB data therefrom.

Accordingly, adopting the data accessing method according to the first embodiment of the present disclosure can store the first data into the storage device in alignment according to the size of the minimum access unit. Since the first data is stored into the storage device in alignment, it can be ensured that the first data only occupies the least number of minimum access units during the write process; thereby an optimal write speed can be obtained. Similarly, when the first data needs to be read, as compared with that the first data is dispersed in a large amount of minimum access units, since the first data only occupies the least number of minimum access units, the first data can be read with the fastest speed. Therefore, in the present disclosure, high-speed data access performance can be achieved and user experience when using the storage device is improved adequately.

In addition, it should be noted that, in the process of storing the first data into the integer multiple of the minimum access unit in alignment in the above steps S140 and S150, in the case that the storing device supports multi-channel writing, the operating system also may further acquire a first number of parallel channels in the storage device in advance in step S110, and start the first number of write threads, so as to concurrently store the first data into the integer multiple of the minimum access unit in alignment.

It is assumed that it is learned in step S110 that the SSD supports write or read operation being performed in 8 channels simultaneously, then in the above steps S140 and S150, after the first file is padded from 3 KB to 4 KB, physical addresses for writing the first file and the second file in parallel may be allocated, for example, the physical address of the first file is Block 1 Page 1, whereas the physical address of the second file is Block 2 Page 1. Thereafter, two channels may be adopted to simultaneously write the first file to the physical address Block 1 Page 1, and the second file to the physical address Block 2 Page 1, in order to obtain higher data access efficiency.

In the first embodiment of the present disclosure, the first data may be stored into the storage device in alignment according to the size of the minimum access unit. However, in practice, due to a limited storage space and a limited storage life of the storage device, if any types of data are stored into the storage device in alignment uniformly, and it is bound to store a large amount of padding data, which wastes disk space.

Preferably, in a second embodiment of the present disclosure, before storing the first data in alignment, it is possible to determine a type of data, and thereby determine whether to execute the operation of storing in alignment, so as to ensure an optimal utilization of the storage space.

Figure 2:
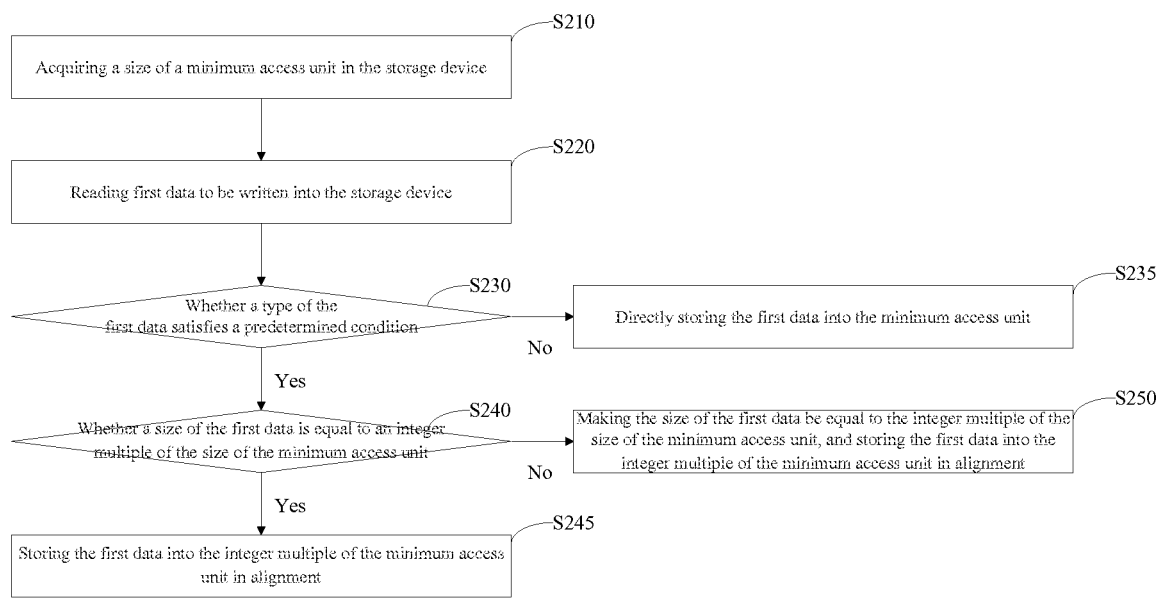
FIG. 2 illustrates a data accessing method according to a second embodiment of the present disclosure.

FIG. 2 illustrates a data accessing method according to the second embodiment of the present disclosure.

The data accessing method illustrated in FIG. 2 may be applied to an electronic device that includes a storage device. Hereinafter, the data accessing method according to the second embodiment of the present disclosure will be described with reference to still the specific scenario in the first embodiment.

As illustrated in FIG. 2, the data accessing method comprises:

in step S210 acquiring a size of a minimum access unit in the storage device;

in step S220, reading first data to be written into the storage device.

Steps S210 to S220 in FIG. 2 are the same as steps S110 to S120 in FIG. 1, respectively; therefore, repeated description thereof will be omitted.

In step S230, determining whether a type of the first data satisfies a predetermined condition.

For example, after the operating system reads the first data to be written into the storage device into memory, and prior to storing the first data in accordance with an alignment manner, first it is determined whether the type of the first data satisfies a predetermined condition for storing in alignment. When it is determined that the type of the first data satisfies the condition of storing in alignment, the method proceeds to step S240, otherwise the method proceeds to step S235.

Since the stored data can be read at the fastest speed when the alignment manner is adopted, therefore in one example, the condition for storing in alignment may be set as data having a smaller size and/or requiring a higher read speed.

For example, such data may preferably be drive files, system boot files of the operating system. Because of the limited size of such data, adopting the manner of storing in alignment for such data will not consume too much storage space, and it can ensure that the electronic device can run at the fastest speed when being powered on or performing operations, which enhances the user experience adequately.

Conversely, if the data to be stored is data that has a larger size and has no specific requirement with regard to the access speed, it may be stored without adopting the manner of storing in alignment, in order to save storage space in the storage device.

For example, such data may be a multimedia file, like a movie or music file. Due to the large size of such data, often at a magnitude of several megabytes (MB) or several hundred MB, and needs to take up thousands of memory pages to store. In this case, even if it is stored adopting the non-alignment storage manner, there will be an increase of the physical storage space of several memory pages at most, the proportion occupied is extremely small, and will not cause great change to the file read speed.

In step S235, directly storing the first data into the minimum access unit.

As described above, when it is determined that the first data does not satisfy the condition for storing in alignment, or the electronic device does not enable the data accessing method of the present disclosure, the first data may be directly stored into the minimum access unit in a conventional manner, in order to avoid occupying too much storage space of the storage device.

Preferably, the first data may be directly stored into one or more minimum access units by operations of: reading other data to be written into the storage device, until a sum of the size of the first data and a size of the other data is equal to an integer multiple of the minimum access unit; and directly storing the first data and the other data into one or more minimum access units.

As for the specific process, the conventional example when the first file and the second file are written in step S110 as described in the first embodiment of the present disclosure can be consulted.

In step S240, determining whether the size of the first data is equal to an integer multiple of the size of the minimum access unit.

When it is determined that the first data satisfies the condition for storing in alignment, subsequent steps of the operation of storing in alignment will be executed continuously.

In step S245, storing the first data into the integer multiple of the minimum access unit in alignment.

In step S250, adding padding data to the first data such that the size of the first data is equal to the integer multiple of the size of the minimum access unit, and storing the first data into the integer multiple of the minimum access unit in alignment.

Steps S240 to S250 in FIG. 2 are the same as steps S130 to S150 in FIG. 1, respectively; therefore, repeated description thereof will be omitted.

Accordingly, adopting the data accessing method according to the second embodiment of the present disclosure can weigh between the data access speed and the occupied data storage space, and avoid consuming excessive storage space in a blind pursuit of data read speed, which may reduce the life of the storage device.

In the first embodiment of the present disclosure, the manner of storing in alignment in accordance with the size of the minimum access unit can be adopted for the first data, so as to obtain an optimal read speed. However, since the aligned data may still be dispersedly scattered in different locations of the storage space, it is desirable to further perform an arranging operation on the storage device, so that the effective minimum access unit can be concentrated into a complete block as much as possible.

Preferably, in a third embodiment of the present disclosure, after the first data is aligned in accordance with the size of the minimum access unit, it is possible to further perform a space arranging operation.

Figure 3:
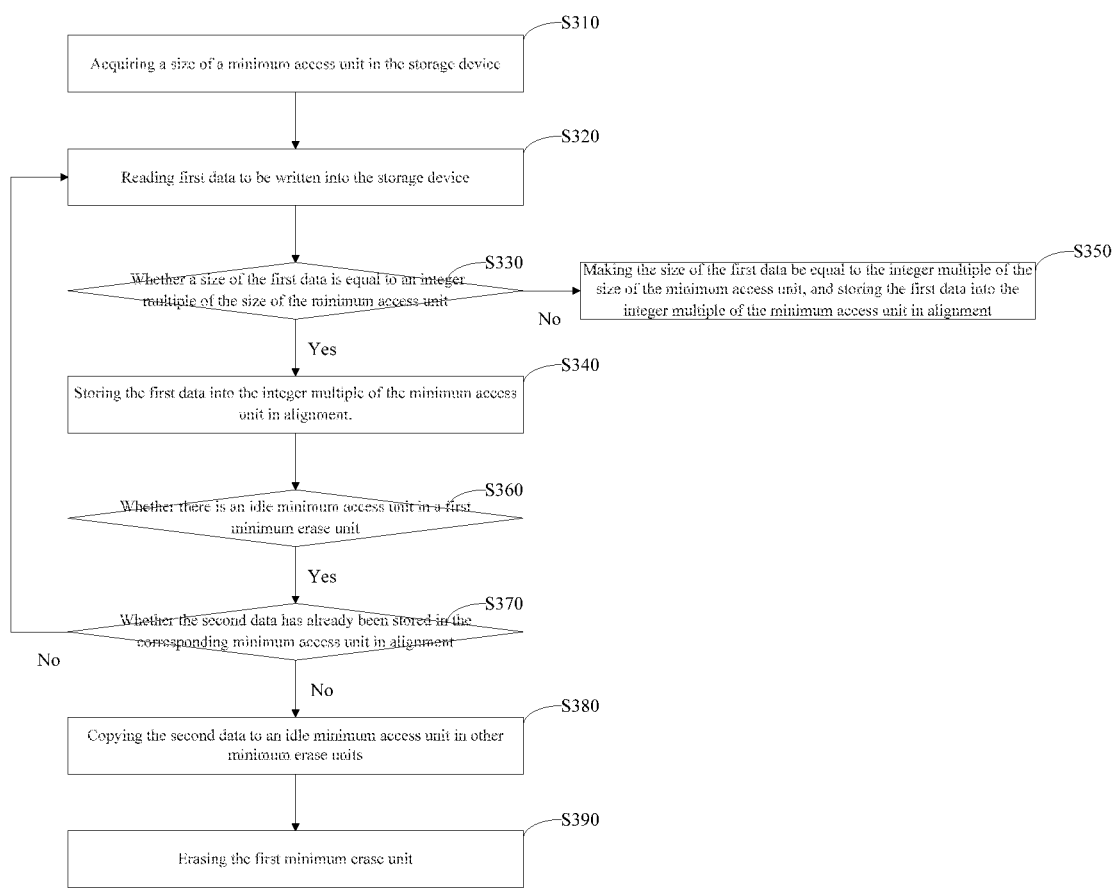
FIG. 3 illustrates a data accessing method according to a third embodiment of the present disclosure.

FIG. 3 illustrates a data accessing method according to the third embodiment of the present disclosure.

The data accessing method illustrated in FIG. 3 may be applied to an electronic device that includes a storage device. Hereinafter, the data accessing method according to the third embodiment of the present disclosure will be described with reference to still the specific scenario in the first embodiment.

As illustrated in FIG. 3, the data accessing method comprises:

in step S310, acquiring a size of a minimum access unit in the storage device;

in step S320, reading first data to be written into the storage device;

in step S330, determining whether a size of the first data is equal to an integer multiple of the size of the minimum access unit;

in step S340, if the size of the first data is equal to an integer multiple of the size of the minimum access unit, storing the first data into the integer multiple of the minimum access unit in alignment;

in step S350, adding padding data to the first data such that the size of the first data is equal to the integer multiple of the size of the minimum access unit, and storing the first data into the integer multiple of the minimum access unit in alignment.

Steps S310 to S350 in FIG. 3 are the same as steps S110 to S150 in FIG. 1, respectively; therefore, repeated description thereof will be omitted.

In step S360, determining whether there is an idle minimum access unit in a first minimum erase unit.

After the first data is aligned in accordance with the size of the minimum access unit, it is possible for the operating system to further perform a space arranging operation on the storage device, so that the effective minimum access unit can be concentrated into a complete block as much as possible.

To this end, it may be first determined whether there is an idle minimum access unit in a first minimum erase unit. If yes, it suggests that space arranging is necessary for the first minimum erase unit, and this method proceeds to step S370, otherwise, it suggests that the first minimum erase unit needs no space arranging, the method of the present disclosure ends.

For example, an arranging command for triggering the arranging operation may be transmitted to the storage device along with the write command for the first data. Alternatively, the arranging operation may also be performed when the system is idle or based on user demand. In this case, the operating system may send a separate a ranging command to the storage device to cause the storage device to detect conditions of its own storage space.

In this embodiment, the explanation is continued with the first case as an example. After the storage device receives the arranging command, it may determine whether there is an idle minimum access unit in a first minimum erase unit (e.g., memory block) that includes a first minimum access unit (e.g., memory page), the first minimum access unit is the minimum storage unit to store the first data.

As described above, since one storage block is composed of 256 memory pages, so that a controller in the SSD can determine whether 256 memory pages in the memory block are all occupied.

In step S370, determining whether the second data has already been stored in the corresponding minimum access unit in alignment.

If the determining result is positive, i.e., if there is an idle minimum access unit in the first minimum erase unit, an attempt may be made to concentrate the data stored in the first minimum erase unit and other data to another minimum erase unit.

Preferably, prior to arranging the first minimum erase unit, it may be first determined whether the second data in the first minimum erase unit has already been stored in the corresponding minimum access unit in alignment according to the size of the minimum access unit. If yes, then the method proceeds to step S380, to continue the space arranging operation; otherwise, the method regards the second data as the first data, returns to execute step S320, first re-writes it into the storage device, and then performs an arranging operation.

Of course, prior to that the operating system reads the second data into memory to again execute the write action in an alignment manner, a type of the data may also be first determined, as described in the second embodiment, to determine whether needs to adopt the manner of storing in alignment.

In step S380, copying the second data to an idle minimum access unit in other minimum erase units.

If the second data has already been stored into the corresponding minimum access unit in alignment, or the second data does not needs to be stored in the manner of storing in alignment, then the second data, which is stored in the minimum access unit in the first minimum erase unit, may be copied to an idle minimum access unit in other minimum erase units.

Preferably, before performing the copying operation, it may be first determined whether an amount of the minimum access unit where the second data is stored in the first minimum erase unit is less than an amount of the idle minimum access unit. If yes, the second data, which is stored in the minimum access unit in the first minimum erase unit, is copied to an idle minimum access unit in other minimum erase units.

In this way, it is possible to avoid performing data transfer operation on the memory block that has almost been written to the full, for such data operation entails a huge workload. In this case, selecting to write to the full the idle memory page of the memory block that has almost been written to the full is obviously better than transferring a large amount of data in the occupied memory page into another memory block.

In step S390, erasing the first minimum erase unit.

When valid data stored in the first minimum erase unit is totally transferred to another minimum erase unit, the storage device can erase the first minimum erase unit in order to release the space of the first minimum erase unit for other storage operations.

Accordingly, adopting the data accessing method according to the third embodiment of the present disclosure not only can align the allocated physical address in accordance with the memory page and store data therein correspondingly, but also can make the SSD perform the arranging operation, to concentrate all of the valid memory pages to a complete storage block as much as possible, and release more free memory blocks. This saves disk space and can improve execution efficiency of the SSD.

In the foregoing embodiments of the present disclosure, whether the manner of storing in alignment in accordance with the size of the minimum access unit is adopted for the first data can be decided in the storage device according to the type of data, and an arranging operation may be further performed on the storage device. However, in practice, the user may further desire that the digital storage device can also support the traditional disk defragment function.

Preferably, in a fourth embodiment of the present disclosure, the disk defragment function applied for the traditional HDD may be improved so that it is well suited for the digital storage device.

Figure 4:
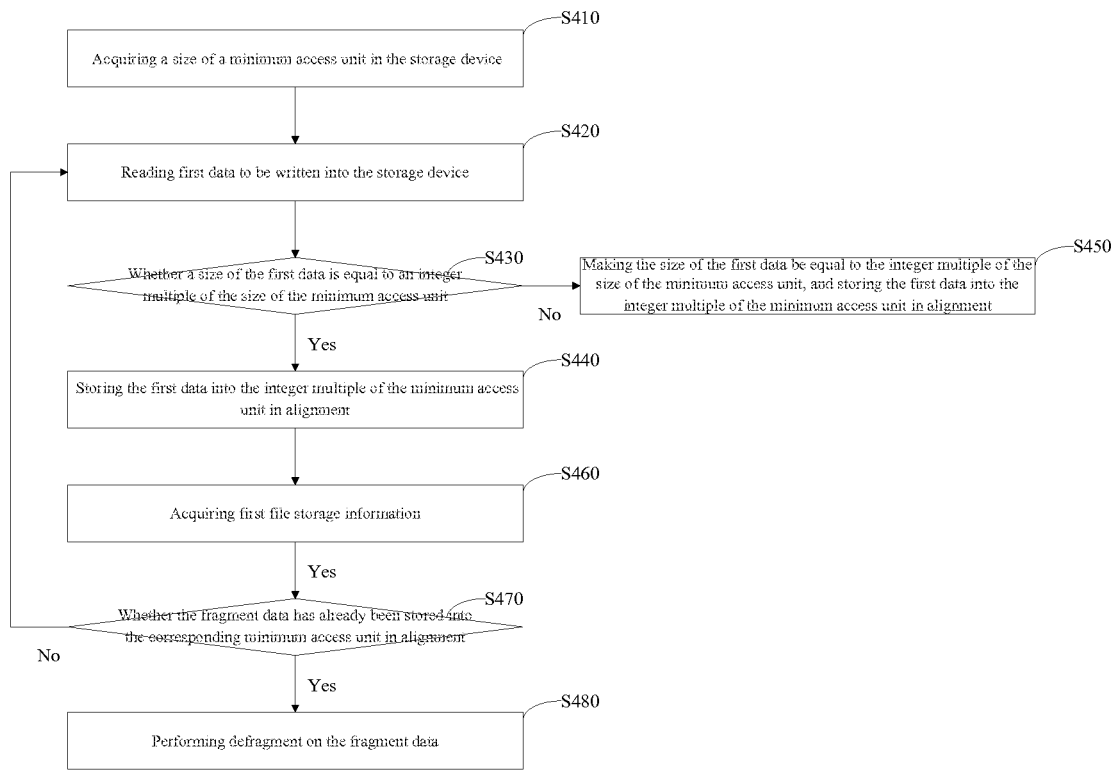
FIG. 4 illustrates a data accessing method according to a fourth embodiment of the present disclosure.

FIG. 4 illustrates a data accessing method according to the fourth embodiment of the present disclosure.

The data accessing method illustrated in FIG. 4 may be applied to an electronic device that includes a storage device. Hereinafter, the data accessing method according to the fourth embodiment of the present disclosure will be described with reference to still the specific scenario in the first embodiment.

As illustrated in FIG. 4, the data accessing method comprises:

in step S410, acquiring a size of a minimum access unit in the storage device;

in step S420, reading first data to be written into the storage device;

in step S430, determining whether a size of the first data is equal to an integer multiple of the size of the minimum access unit;

in step S440, storing the first data into the integer multiple of the minimum access unit in alignment;

in step S450, adding padding data to the first data such that the size of the first data is equal to the integer multiple of the size of the minimum access unit, and storing the first data into the integer multiple of the minimum access unit in alignment.

Steps S410 to S450 in FIG. 4 are the same as steps S110 to S150 in FIG. 1, respectively; therefore, repeated description thereof will be omitted.

In step S460, acquiring first file storage information.

After the operating system writes the first data into the storage device in alignment, it is possible for the operating system to perform a defragment operation. For this purpose, the operating system may transmit, to the storage device, a request for acquiring first file storage information, which indicates a distribution of fragment data of the first file on the storage device.

For example, the request command for acquiring the first file storing information may be transmitted to the storage device along with the write command for the first data. Alternatively, the request may also be performed when the system is idle or based on user demand. In this case, the operating system may send a separate request command to the storage device to cause the storage device to detect conditions of its own fragment data.

In this embodiment, the explanation is continued with the first case as an example. After the storage device receives the request command, the controller may acquire the first file storage information relative to the first file based on the address mapping table. Thereafter, the storage device may transmit, to the operating system, a response for feeding back the first file storage information, so that the operating system receives the first file storage information.

In step S470, determining whether the fragment data has already been stored into the corresponding minimum access unit in alignment.

Thereafter, the operating system may perform defragment on the fragment data according to the first file storage information.

Like step S370 in the third embodiment, preferable, before operating on the fragment data, it may be first determined whether the fragment data of the first file has already been stored into the integer multiple of the minimum access unit in alignment. If yes, then this method proceeds to step S480, to continue the defragment operation; otherwise, this method regards the second data as the aforesaid first data, returns to step S420, first re-writes it into the storage device, and then performs an arranging operation.

In step S480, performing defragment on the fragment data.

If the second data has already been stored into the corresponding minimum access unit in alignment, or the second data does not need to adopt the manner of storing in alignment, then defragment may be performed on the fragment data generated during the process of storing the first data.

Here, the specific process of the defragment operation will be described.

For convenience of explanation, in a specific example, it is assumed that size of the first file is 12 KB, and at present, from the perspective of the operating system, the first file is stored dispersedly in three logical addresses, namely, Sector 101-104, Sector 201-204, and Sector 009-012, whereas from the perspective of the storage device, the first file is dispersedly stored in three physical addresses, namely, Block 1 Page 1, Block 1 Page 10, and Block Storage 1 Page 20. That is, the following entry is added in the address mapping table:

| Logical address | Physical address |
| --- | --- |
| Sector 101-104 | Block 1 Page 1 |
| Sector 201-204 | Block 1 Page 10 |
| Sector 009-012 | Block 1 Page 20 |

At this time, because that the logical address is not continuous, the operating system will determine that the first file has fragment data, thus, the operating system may start a defragment process, and inform the controller of the SSD to complete the defragment operation in cooperation.

First, the operating system may transfer the fragment data in the logical address Sector 101-104 to Sector 001-004 (assuming that it is currently empty). Accordingly, in the SSD, it may be determined that the logical address Sector 101-104 corresponds to the physical address Block 1 Page 1 according to the current address mapping table. Thereafter, a physical address is re-allocated for a first data fragment of the first file, for example, Block 2 Page 1, and the first 4 KB data of the first file is transferred from the physical address Block 1 Page 1 to Block 2 Page 1.

In this case, the address mapping table becomes:

| Logical address | Physical address |
| --- | --- |
| Sector 001-004 | Block 2 Page 1 |
| Sector 201-204 | Block 1 Page 10 |
| Sector 009-012 | Block 1 Page 20 |

Thereafter, the operating system may continue to transfer the data fragment in the logical address Sector 201-204 to Sector 005-008 (assuming it is currently empty). Accordingly, in the SSD, it may be determined that the logical address Sector 201-204 corresponds to the physical address Block 1 Page 10 according to the current address mapping table. Thereafter, a physical address is re-allocated for a second data fragment of the first file, for example, Block 2 Page 2, and the middle 4 KB data of the first file is transferred from the physical address Block 1 Page 10 to Block 2 Page 2.

In this case, the address mapping table becomes:

| Logical address | Physical address |
| --- | --- |
| Sector 001-004 | Block 2 Page 1 |
| Sector 005-008 | Block 2 Page 2 |
| Sector 009-012 | Block 1 Page 20 |

Finally, the operating system may continue to perform subsequent defragment operations. However, at this time, the operating system will find out that the data in the logical address Sector 009-012 has become continuous with respect to the data on which defragment has been performed. In this case, in the prior art, the defragment operation on fragment data of the first file is completed. However, according to the address mapping table, it is apparent that the first file still is not continuous in the physical storage space.

For this purpose, in the embodiment of the present disclosure, it is enabled that the operating system issues an overlapping-write operation to the logical address that does not need a defragment, and re-writes the data therein into the logical address.

Accordingly, in the SSD, it may be determined according to the current address mapping table that the logical address Sector 009-012 corresponds to the physical address Block 1

Page 20. Then, a physical address is re-allocated for a third data fragment of the first file, for example, Block 2 Page 3, and the last 4 KB data of the first file is transferred from the physical address Block 1 Page 20 to Block 2 Page 3.

In this case, the address mapping table becomes:

| Logical address | Physical address |
|---|---|
| Sector 001-004 | Block 2 Page 1 |
| Sector 005-008 | Block 2 Page 2 |
| Sector 009-012 | Block 2 Page 3 |

Thus, it can be found out from the above address mapping table that, the fragment data of the first file has already been defragmented successfully, the storage space of the first file is continuous not only in the level of logical address of the operating system but also in the level of the physical address in the SSD.

Further, preferably, if the SSD supports multi-channels (e.g., eight), in order to give full play to write and read speed of the multi-channels, the physical address in the SSD may be adjusted. In this case, the address mapping table becomes:

| Logical address | Physical address |
|---|---|
| Sector 001-004 | Block 2 Page 1 |
| Sector 005-008 | Block 3 Page 1 |
| Sector 009-012 | Block 4 Page 1 |

Accordingly, adopting the data accessing method according to the fourth embodiment of the present disclosure can successfully achieve the defragment function performed by the operating system on the digital storage device, so as to effectively perform defragment on the digital storage device. In this way, the advantages of the digital storage device can be used to a greater extent to improve its performance.

Figure 5:
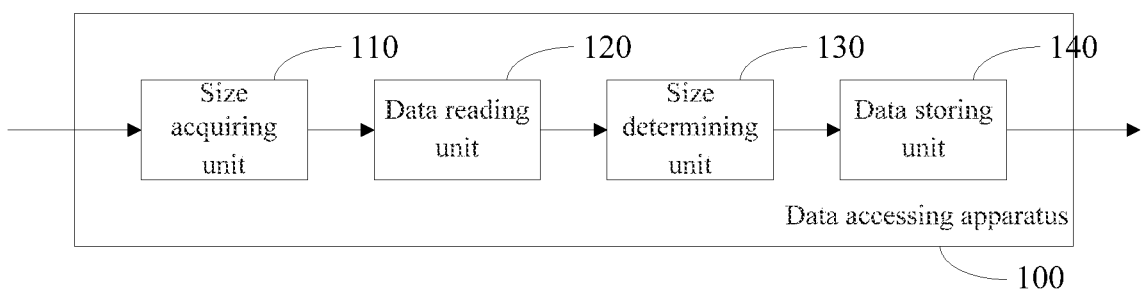
FIG. 5 illustrates a data accessing apparatus according to the first embodiment of the present disclosure.

FIG. 5 illustrates a data accessing apparatus according to the first embodiment of the present disclosure.

The data accessing apparatus 100 as illustrated in FIG. 5 may be applied to an electronic device that includes a storage device.

The data accessing method according to the first embodiment of the present disclosure as illustrated in FIG. 1 may be implemented by the data accessing apparatus 100 as illustrated in FIG. 5. The data accessing apparatus 100 may be used to access data with regard to the electronic device, so that the electronic device can perform operations like data accessing and defragment operation etc. on the storage device in a better way.

The data accessing apparatus 100 may communicate with the electronic device in any way.

In one example, the data accessing apparatus 100 may be integrated into the electronic device as a software module and/or a hardware module, in other words, the electronic device may include the data accessing apparatus 100. For example, when the electronic device is a smart table, the data accessing apparatus 100 may be a software module of the operating system of the smart desktop, or may be an application developed directed to the smart desktop; of course, the data accessing apparatus 100 may also be one of many hardware modules of the smart desktop.

Alternatively, in another example, the data accessing apparatus 100 may also be a device separated from the electronic device, and the data accessing apparatus 100 may be connected to the electronic device through a wired and/or wireless network, and transmit interaction information in accordance with an agreed data format.

As illustrated in FIG. 5, the data accessing apparatus 100 comprises: a size acquiring unit 110, a data reading unit 120, a size determining unit 130, and a data storing unit 140.

The size acquiring unit 110 is configured to acquire a size of a minimum access unit in the storage device.

Specifically, the size acquiring unit 110 may acquire a size of a minimum access unit in the storage device by operations of: transmitting, to the storage device, a request for acquiring the size of the minimum access unit in the storage device; and receiving, from the storage device, a response for feeding back the size of the minimum access unit in the storage device.

The data reading unit 120 is configured to read first data to be written into the storage device.

The size determining unit 130 is configured to determine whether a size of the first data is equal to an integer multiple of the size of the minimum access unit.

The data storing unit 140 is configured to, if the size of the first data is equal to an integer multiple of the size of the minimum access unit, store the first data into the integer multiple of the minimum access unit in alignment; and, otherwise, add padding data to the first data such that the size of the first data is equal to the integer multiple of the size of the minimum access unit, and store the first data into the integer multiple of the minimum access unit in alignment.

Specifically, the data storing unit 140 may store the first data into the integer multiple of the minimum access unit in alignment by operations of: determining a first start address to start storing the first data; determining whether the first start address is a start address of one minimum access unit; if yes, beginning with the first start address, storing the first data into the integer multiple of the minimum access unit in alignment; and otherwise, shifting the first start address, so that the first start address becomes a start address of one minimum access unit, and beginning with the first start address, storing the first data into the integer multiple of the minimum access unit in alignment.

In addition, the data storing unit 140 may also store the first data into the integer multiple of the minimum access unit in alignment by operations of: acquiring a first number of parallel channels in the storage device; and starting the first number of write threads, so as to concurrently store the first data into the integer multiple of the minimum access unit in alignment.

The specific configurations and operations of the respective units in the data accessing apparatus 110 according to the first embodiment of the present disclosure have already been described in detail in the information accessing method described with reference to FIG. 1, therefore, repeated description thereof will be omitted.

Thus it can be seen that, adopting the data accessing apparatus according to the first embodiment of the present disclosure can store the first data into the storage device in alignment according to the size of the minimum access unit. Since the first data is stored into the storage device in alignment, it can be ensured that the first data only occupies the least number of minimum access units during the write process; thereby an optimal write speed can be obtained. Similarly, when the first data needs to be read, as compared with that the first data is dispersed in a large amount of minimum access units, since the first data only occupies the least number of minimum access units, the first data can be read with the fastest speed. Accordingly, in the present disclosure, high-speed data access performance can be achieved and user experience when using the storage device is improved adequately.

Figure 6:
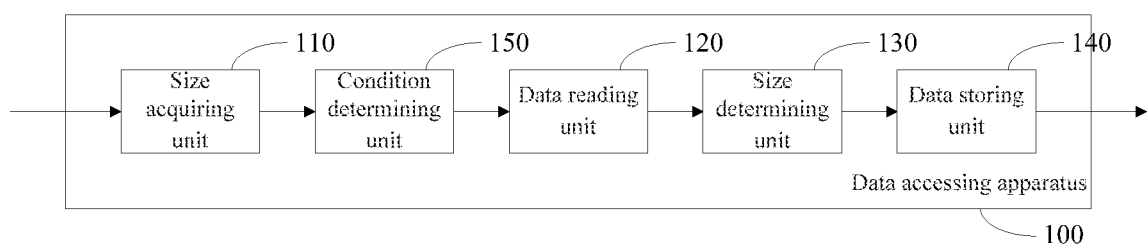
FIG. 6 illustrates a data accessing apparatus according to the second embodiment of the present disclosure.

FIG. 6 illustrates a data accessing apparatus according to the second embodiment of the present disclosure.

The data accessing method according to the second embodiment of the present disclosure as illustrated in FIG. 2 may be implemented by the data accessing apparatus 100 in FIG. 6. As illustrated in FIG. 6, similar to FIG. 5, the data accessing apparatus 100 may comprise: a size acquiring unit 110, a data reading unit 120, a size determining unit 130, and a data storing unit 140. Further, preferably, the data accessing apparatus 100 may further comprise: a condition determining unit 150.

The size acquiring unit 110 is configured to acquire a size of a minimum access unit in the storage device;

The data reading unit 120 is configured to read first data to be written into the storage device;

The condition determining unit 150 is configured to determine whether a type of the first data satisfies a predetermined condition before the size determining unit 130 determines whether a size of the first data is equal to an integer multiple of the size of the minimum access unit; if yes, notifies the size determining unit 130 to determine whether a size of the first data is equal to an integer multiple of the size of the minimum access unit; and otherwise, notifies the data storing unit 150 to directly store the first data into one or more minimum access units.

The size determining unit 130 is configured to determine whether a size of the first data is equal to an integer multiple of the size of the minimum access unit.

The data storing unit 140 is configured to, if the size of the first data is equal to an integer multiple of the size of the minimum access unit, store the first data into the integer multiple of the minimum access unit in alignment; and, otherwise, add padding data to the first data such that the size of the first data is equal to the integer multiple of the size of the minimum access unit, and store the first data into the integer multiple of the minimum access unit in alignment.

Specifically, the data storing unit 150 may directly store the first data into one or more minimum access units by operations of: reading other data to be written to the storage device, until a sum of the size of the first data and a size of the other data is equal to the integer multiple of the minimum access unit; and directly storing the first data and the other data into one or more minimum access units.

The specific configurations and operations of the respective units in the data accessing apparatus 100 according to the second embodiment of the present disclosure have already been described in detail in the information accessing method described with reference to FIG. 2; therefore, repeated description thereof will be omitted.

Accordingly, adopting the data accessing apparatus according to the second embodiment of the present disclosure can weigh between the data access speed and the occupied data storage space, and avoid consuming excessive storage space in a blind pursuit of data read speed, which may reduce the life of the storage device.

Figure 7:
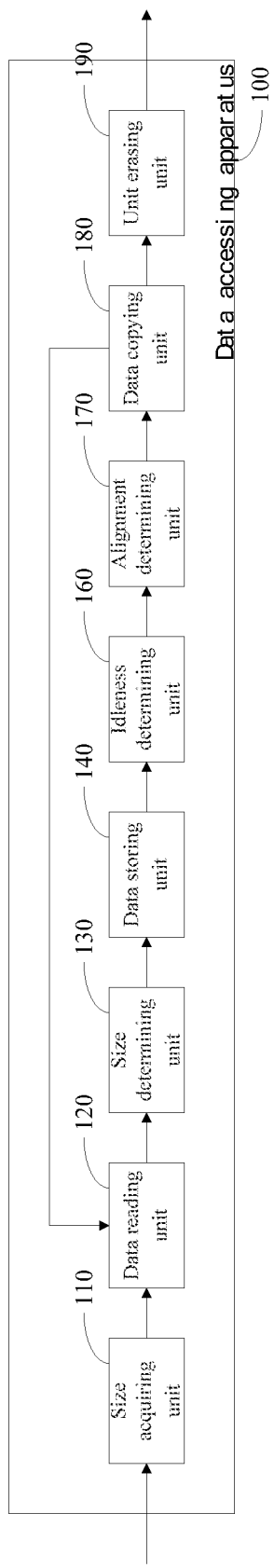
FIG. 7 illustrates a data accessing apparatus according to the third embodiment of the present disclosure.

FIG. 7 illustrates a data accessing apparatus according to the third embodiment the present disclosure.

The data accessing method according to the third embodiment of the present disclosure as illustrated in FIG. 3 may be implemented by the data accessing apparatus 100 as illustrated in FIG. 7. As illustrated in FIG. 7, similar to FIG. 5, the data accessing apparatus 100 may comprise: a size acquiring unit 110, a data reading unit 120, a size determining unit 130 and a data storing unit 140. Further, preferably, the data accessing apparatus 100 may further comprise: an idleness determining unit 160, an alignment determining unit 170, a data copying unit 180, and a unit erasing unit 190.

The size acquiring unit 110 is configured to acquire a size of a minimum access unit in the storage device.

The data reading unit 120 is configured to read first data to be written into the storage device.

The size determining unit 130 is configured to determine whether a size of the first data is equal to an integer multiple of the size of the minimum access unit.

The data storing unit 140 is configured to, if the size of the first data is equal to an integer multiple of the size of the minimum access unit, store the first data into the integer multiple of the minimum access unit in alignment; and, otherwise, add padding data to the first data such that the size of the first data is equal to the integer multiple of the size of the minimum access unit, and store the first data into the integer multiple of the minimum access unit in alignment.

The idleness determining 160 is configured to determine whether there is an idle minimum access unit in a first minimum erase unit, wherein one minimum erase unit includes a plurality of minimum access units.

Preferably, the alignment determining unit 170 is configured to determine whether the second data in the first minimum erase unit has already been stored in the corresponding minimum access unit in alignment, before the data copying unit 180 copies second data, which is stored in the minimum access unit in the first minimum erase unit, to an idle minimum access unit in other minimum erase units; if yes, notify the data copying unit 180 to copy the second data, which is stored in the minimum access unit in the first minimum erase unit, to an idle minimum access unit in other minimum erase units; and otherwise, notify the data reading unit 120 to read the second data as the first data to rewrite it into the storage device.

The data copying unit 180 is configured to, if there is an idle minimum access unit in the first minimum erase unit, copy second data, which is stored in the minimum access unit in the first minimum erase unit, to an idle minimum access unit in other minimum erase units.

Specifically, the data copying unit 180 may copy the second data, which is stored in the minimum access unit in the first minimum erase unit, to an idle minimum access unit in other minimum erase units by operations of: determining whether an amount of the minimum access unit where the second data is stored in the first minimum erase unit is less than an amount of the idle minimum access unit; and if yes, copying the second data, which is stored in the minimum access unit in the first minimum erase unit, to an idle minimum access unit in other minimum erase units.

The unit erasing unit 190 is configured to erase the first minimum erase unit.

The specific configurations and operations of the respective units in the data accessing apparatus 100 according to the third embodiment of the present disclosure have already been described in detail in the information accessing method described with reference to FIG. 3; therefore, repeated description thereof will be omitted.

Accordingly, adopting the data accessing apparatus according to the third embodiment of the present disclosure not only can align the allocated physical address in accordance with the memory page and store data therein correspondingly, but also can make the SSD perform the arranging operation, to concentrate all of the valid memory pages to a complete storage block as much as possible, and release more free memory blocks. This saves disk space and can improve execution efficiency of the SSD.

Figure 8:
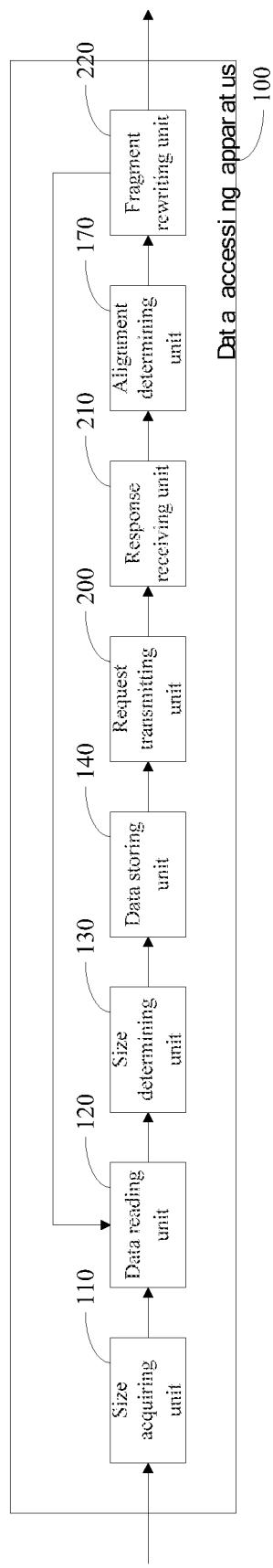
FIG. 8 illustrates a data accessing apparatus according to the fourth embodiment of the present disclosure.

FIG. 8 illustrates a data accessing apparatus according to the fourth embodiment of the present disclosure.

The data accessing method according to the fourth embodiment of the present disclosure as illustrated in FIG. 4 may be implemented by the data accessing apparatus 100 in FIG. 8. As illustrated in FIG. 8, similar to FIG. 5, the data accessing apparatus 100 may comprise: a size acquiring unit 110, a data reading unit 120, a size determining unit 130, and a data storing unit 140. Further, preferably, the data accessing apparatus 100 may further comprise: a request transmitting unit 200, a response receiving unit 210, an alignment determining unit 170, and a fragment rewriting unit 220.

The size acquiring unit 110 is configured to acquire a size of a minimum access unit in the storage device.

The data reading unit 120 is configured to read first data to be written into the storage device.

The size determining unit 130 is configured to determine whether a size of the first data is equal to an integer multiple of the size of the minimum access unit.

The data storing unit 140 is configured to, if the size of the first data is equal to an integer multiple of the size of the minimum access unit, store the first data into the integer multiple of the minimum access unit in alignment; and, otherwise, add padding data to the first data such that the size of the first data is equal to the integer multiple of the size of the minimum access unit, and store the first data into the integer multiple of the minimum access unit in alignment.

The request transmitting unit 200 is configured to transmit, to the storage device, a request for acquiring first file storage information, which indicates a distribution of fragment data of the first file on the storage device.

The response receiving unit 210 is to receive, from the storage device, a response for feeding back the first file storage information.

The alignment determining unit 170 is configured to determine whether the fragment data of the first file has already been stored in the integer multiple of the minimum access unit in alignment according to the first file storage information.

The fragment rewriting unit 220 is configured to if the fragment data of the first file has not been stored in the integer multiple of the minimum access unit in alignment, access the fragment data of the first file that is not stored in alignment as the first data, to rewrite into the storage device.

The specific configurations and operations of the respective units in the data accessing apparatus 100 according to the fourth embodiment of the present disclosure have already been described in detail in the information accessing method described with reference to FIG. 4; therefore, repeated description thereof will be omitted.

Accordingly, adopting the data accessing apparatus according to the fourth embodiment of the present disclosure can successfully achieve the defragment function performed by the operating system on the digital storage device, so as to effectively perform defragment on the digital storage device. In this way, the advantages of the digital storage device can be used to a greater extent to improve its performance.

It should be noted that, although various embodiments of the present disclosure are described herein with the above respective units as executing bodies for the individual steps, as will be appreciated by a person skilled in the art, the present disclosure is not limited thereto. Executing body of each step may be taken on by other one or more equipments, devices, elements, and even modules.

For example, the steps executed by the size acquiring unit 110, the data reading unit 120, the size determining unit 130, the data storing unit 140, the condition determining unit 150, the idleness determining unit 160, the alignment determining unit 170, the data copying unit 180, the unit erasing unit 190, the request transmitting unit 200, the response receiving unit 210, the fragment rewriting unit 220 mentioned above may be implemented uniformly by a central processing unit (CPU) of the electronic device.

Further, although the data access method and the data access apparatus according to the present disclosure are described by the respective embodiments separately, as can be seen by a person skilled in the art that, the respective embodiments may be combined arbitrarily to obtain an optimal implementation.

With the description of the above embodiments, a person skilled in the art can clearly learn that the present disclosure may be implemented in a manner of software plus a necessary hardware platform, and of course it may also be implemented fully by software or hardware. Based on such understanding, the technical solutions of the present disclosure that contribute to the BACKGROUND ART may be embodied in whole or in part in the form of a software product. The computer software product may be stored in a storage medium, such as ROM/RAM, magnetic disk, optical disk which include several instructions for causing a computer apparatus (which may be a personal computer, a server, or a network device etc.) to perform the methods described in various embodiments of the present disclosure or certain parts thereof.

Various embodiments of the present disclosure have already been described in detail in the above. However, a person skilled in the art should understand that, various modifications, combinations or sub-combinations may be made to these embodiments without departing from the principles and spirits of the present disclosure, and such modifications are intended to fall within the scope of the present disclosure.

The invention claimed is:

1. A data accessing method applied to an electronic device that includes a non-volatile digital storage device, the method comprising:

in response to a data writing request for writing first data into the storage device, acquiring a size of a minimum access unit of the storage device, the minimum access unit is the minimum unit that the storage device performs a read-write operation;

reading the first data specified in the data writing request into a volatile memory of the electronic device in order to execute the write operation;

determining whether a type of the first data satisfies a predetermined condition for storing in alignment, the condition for storing in alignment is set as the first data comprising drive files of an operating system and system boot files of the operating system so as to ensure that the electronic device a run at a fastest speed when being powered on or performing operations;

if the determining results in an answer of yes, then determining whether a size of the first data is equal to an integer multiple of the size of the minimum access unit;

if the size of the first data is equal to an integer multiple of the size of the minimum access unit, storing the first data in the volatile memory into the integer multiple of the minimum access unit in alignment;

if the size of the first data is not equal to an integer multiple of the size of the minimum access unit, adding padding data to the first data such that the size of the padded first data is equal to the integer multiple of the size of the minimum access unit, and storing the padded first data in the volatile memory into the integer multiple of the minimum access unit in alignment, in response to an arranging command for triggering an arranging operation transmitted to the storage device along with the data writing request, determining whether there is an idle minimum access unit in a first minimum erase unit, wherein one minimum erase unit comprises a plurality of minimum access units;

in response to the determination that there is an idle minimum access unit in the first minimum erase unit, determining whether the second data in the first minimum erase unit is stored in the corresponding minimum access unit in alignment;

if yes, copying the second data, which is stored in the minimum access unit in the first minimum erase unit, to an idle minimum access unit in other minimum erase units, and erasing the first minimum unit; and otherwise, reading the second data as the first data to rewrite it into the storage device.

2. The data accessing method according to claim 1, wherein the step of storing the first data into the integer multiple of the minimum access unit in alignment comprises:

determining a first start address to start storing the first data;

determining whether the first start address is a start address of one minimum access unit;

if yes, storing the first data into the integer multiple of the minimum access unit in alignment by starting from the first start address; and otherwise, shifting the first start address to make the shifted first start address become a start address of one minimum access unit, and storing the first data into the integer multiple of the minimum access unit in alignment by starting from the shifted first start address.

3. The data accessing method according to claim 1, wherein the copying the second data, which is stored in the minimum access unit in the first minimum erase unit, to an idle minimum access unit in other minimum erase units comprises:

determining whether an amount of the minimum access unit, in which the second data is stored, is less than an amount of the idle minimum access unit; and if yes, copying the second data, which is stored in the minimum access unit in the first minimum erase unit, to an idle minimum access unit in other minimum erase units.

4. The data accessing method according to claim 1, wherein if the determining results in an answer of yes, then determining whether a size of the first data is equal to an integer multiple of the size of the minimum access unit; and otherwise, directly storing the first data into one or more minimum access units.

5. The data accessing method according to claim 4, wherein the directly storing the first data into one or more minimum access units comprises:

reading other data to be written into the storage device, until a sum of the size of the first data and a size of the other data is equal to an integer multiple of the minimum access unit; and directly storing the first data and the other data into one or more minimum access units.

6. The data accessing method according to claim 1, wherein the acquiring a size of a minimum access unit in the storage device comprises:

transmitting, to the storage device, a request for acquiring the size of the minimum access unit in the storage device; and receiving, from the storage device, a response for feeding back the size of the minimum access unit in the storage device.

7. The data accessing method according to claim 1, further comprising:

transmitting, to the storage device, a request for acquiring first file storage information, which indicates a distribution of fragment data of the first file in the storage device;

receiving, from the storage device, a response for feeding back the first file storage information;

determining whether the fragment data of the first file is stored in the integer multiple of the minimum access unit in alignment according to the first file storage information; and if the fragment data of the first file is not stored in the integer multiple of the minimum access unit in alignment, rewriting the fragment data of the first file into the storage device and storing the fragment data into integer multiple of the minimum access unit in alignment.

8. The data accessing method according to claim 1, wherein the storing the first data into the integer multiple of the minimum access unit in alignment comprises:

acquiring a first number of parallel channels in the storage device; and starting the first number of write threads to concurrently store the first data into the integer multiple of the minimum access unit in alignment.

9. A data accessing apparatus applied to an electronic device that includes a non-volatile digital storage device, the data accessing apparatus comprises:

a size acquiring unit configured to acquire a size of a minimum access unit in the storage device in response to a data writing request for writing first data into the storage device, the minimum access unit is the minimum unit that the storage device performs a read-write operation;

a data reading unit configured to read the first data specified in the data writing request into a volatile memory of the electronic device to execute the write operation;

a condition determining unit configured to determine whether a type of the first data satisfies a predetermined condition for storing in alignment, the condition for storing in alignment is set as the first data comprising drive files of an operating system and system boot files of the operating system so as to ensure that the electronic device can run at a fastest speed when being powered on or performing operations;

a size determining unit configured to determine whether a size of the first data is equal to an integer multiple of the size of the minimum access unit; and a data storing unit configured to:
if the size of the first data is equal to an integer multiple of the size of the minimum access unit, store the first data in the volatile memory into the integer multiple of the minimum access unit in alignment;

if the size of the first data is not equal to an integer multiple of the size of the minimum access unit, add padding data to the first data such that the size of the padded first data is equal to the integer multiple of the size of the minimum access unit, and store the padded first data in the volatile memory into the integer multiple of the minimum access unit alignment;

an idleness determining unit configured to determine whether there is an idle minimum access unit in a first minimum erase unit, wherein one minimum erase unit comprises a plurality of minimum access units, wherein the determining performed by the idleness determining unit is made in response to an arranging command for triggering an arranging operation transmitted to the storage device along with the data writing request;

an alignment determining unit configured to:
 determine whether the second data in the first minimum erase unit is stored in the corresponding minimum access unit in alignment in response to the determination that there is an idle minimum access unit in the first minimum erase unit;
 if yes, notify the data copying unit to copy the second data, which is stored in the minimum access unit in the first minimum erase unit, to an idle minimum access unit in other minimum erase units; and
 otherwise, notify the data reading unit to read the second data as the first data to rewrite it into the storage device in response to the determination by the alignment determining unit that the second data has not already been stored in the corresponding minimum access unit in alignment; and a data copying unit configured to copy second data stored in the minimum access unit in the first minimum erase unit to an idle minimum access unit in other minimum erase units in response to the determination by the alignment determining unit that the second data has already been stored in the corresponding minimum access unit in alignment; and a unit erasing unit configured to erase the first minimum erase unit.

10. The data accessing apparatus according to claim 9, wherein the data storing unit is further configured to:
 determine a first start address to start storing the first data;
 determine whether the first start address is a start address of one minimum access unit;
 if yes, store the first data into the integer multiple of the minimum access unit in alignment by starting from the first start address; and
 otherwise, shift the first start address to make the shifted first start address become a start address of one minimum access unit, and store the first data into the integer multiple of the minimum access unit in alignment by starting from the shifted first start address.

11. The data accessing apparatus according to claim 9, wherein the data copying unit copies the second data from the minimum access unit in the first minimum erase unit to an idle minimum access unit in other minimum erase units by:
 determining whether an amount of the minimum access unit, in which the second data is stored, is less than an amount of the idle minimum access unit; and
 if yes, copying the second data, which is stored in the minimum access unit in the first minimum erase unit, to an idle minimum access unit in other minimum erase units.

12. The data accessing apparatus according to claim 9, wherein the condition determining unit is further configured to:
 if the determining results in an answer of yes, then notifies the size determining unit to determine whether a size of the first data is equal to an integer multiple of the size of the minimum access unit; and
 otherwise, notifies the data storing unit to directly store the first data into one or more minimum access units.

13. The data accessing apparatus according to claim 12, wherein the data storing unit directly stores the first data into one or more minimum access units by:
 reading other data to be written to the storage device, until a sum of the size of the first data and a size of the other data is equal to the integer multiple of the minimum access unit; and
 directly storing the first data and the other data into one or more minimum access units.

14. The data accessing apparatus according to claim 9, wherein the size acquiring unit acquires a size of a minimum access unit in the storage device by:
 transmitting, to the storage device, a request for acquiring the size of the minimum access unit in the storage device; and
 receiving, from the storage device, a response for feeding back the size of the minimum access unit in the storage device.

15. The data accessing apparatus according to claim 9, further comprising:
 a request transmitting unit configured to transmit, to the storage device, a request for acquiring first file storage information, which indicates a distribution of fragment data of the first file on the storage device;
 a response receiving unit configured to receive, from the storage device, a response for feeding back the first file storage information;
 an alignment determining unit configured to determine whether the fragment data of the first file is stored in the integer multiple of the minimum access unit in alignment according to the first file storage information; and
 a fragment rewriting unit configured to: rewrite the fragment data of the first file into the storage device and storing the fragment data into integer multiple of the minimum access unit in alignment, if the fragment data of the first file is not stored in the integer multiple of the minimum access unit in alignment.

16. The data accessing apparatus according to claim 9, wherein the data storing unit is further configured to:
 acquire a first number of parallel channels in the storage device; and
 start the first number of write threads to concurrently store the first data into the integer multiple of the minimum access unit in alignment.

* * * * *